US005301269A

United States Patent [19]

Alcorn et al.

[11] Patent Number: 5,301,269

[45] Date of Patent: Apr. 5, 1994

[54] WINDOW-RELATIVE DITHER CIRCUIT

[75] Inventors: Byron A. Alcorn, Ft. Collins; Robert W. Cherry, Loveland; Mark D. Coleman; Brian D. Rauchfuss, both of Ft. Collins, all of Colo.

[73] Assignee: Hewlett-Packard Company, Palo Alto, Calif.

[21] Appl. No.: 670,548

[22] Filed: Mar. 15, 1991

[51] Int. Cl.[5] .............................................. G06F 15/62

[52] U.S. Cl. .................................... 395/158; 395/157; 395/162

[58] Field of Search ........................ 364/518, 521, 522; 340/747, 750, 726, 723; 382/42, 47, 54; 395/157, 158, 155, 128, 129, 162

[56] References Cited

U.S. PATENT DOCUMENTS 4,920,571 9/1990 Abe et al. ............................. 382/47

5,001,767 3/1991 Yoneda et al. ......................... 382/50

5,077,678 12/1991 Guttag et al. ....................... 395/157

*Primary Examiner*—Phu K. Nguyen

*Attorney, Agent, or Firm*—Guy J. Kelley

[57] ABSTRACT

A circuit for performing window-relative dithering of intensity data comprises a programmable dither cell; circuitry for comparing dither values stored in the dither cell with selected parts of the intensity values and outputting an increment signal in accordance with the results of the comparison; a wrap prevention circuit for preventing the intensity from being incremented if incrementing would cause the intensity to wrap to a low value; and an adder for incrementing the intensity in response to the increment signal, provided it is not inhibited by the wrap prevention circuit. The dither circuit may be advantageously employed in a computer graphics system to dither pixel intensity values.

12 Claims, 12 Drawing Sheets

| ADDRESS OF PIXEL | | X | | | |
|---|---|---|---|---|---|
| | | 0 | 1 | 2 | 3 |
| Y | 0 | 0 | 8 | 2 | 10 |
| | 1 | 12 | 4 | 14 | 6 |
| | 2 | 3 | 11 | 1 | 9 |
| | 3 | 15 | 7 | 13 | 5 |
PRIOR ART
*Fig. 3*
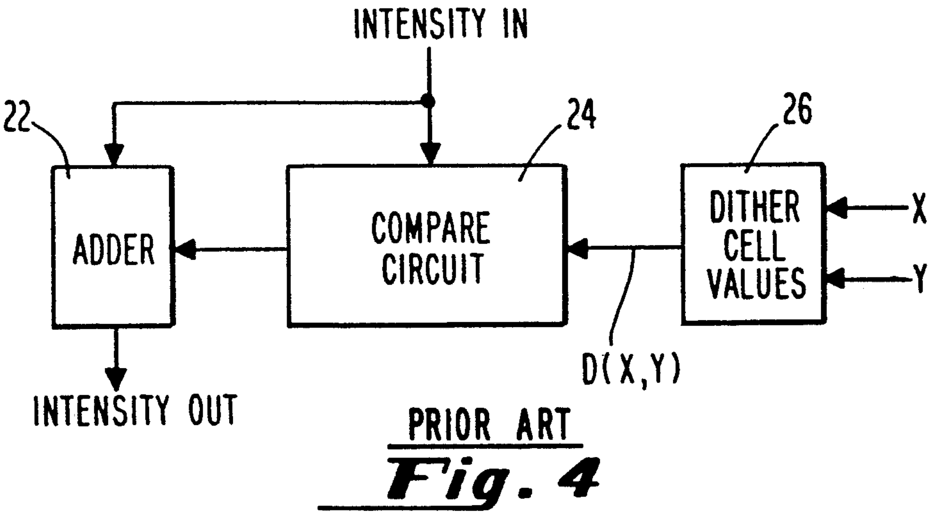
PRIOR ART
*Fig. 4*
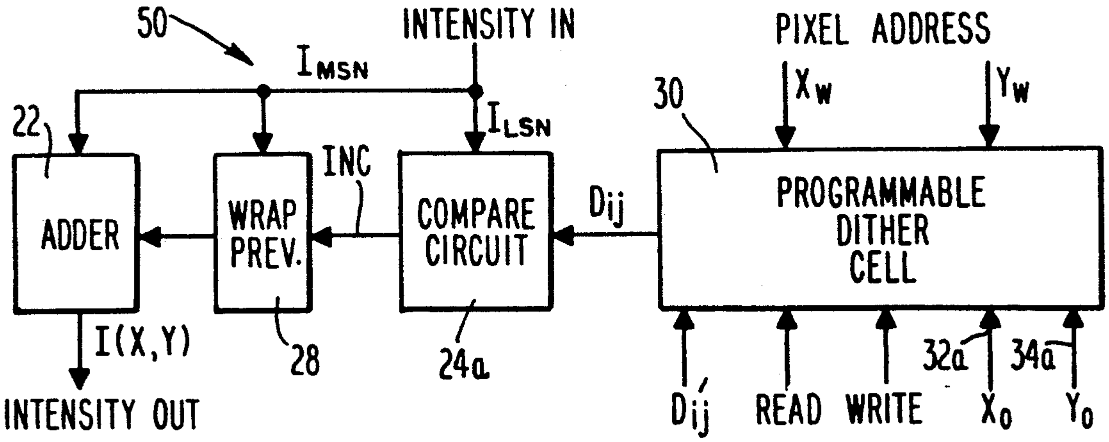
*Fig. 5*

WINDOW-RELATIVE DITHER CIRCUIT

FIELD OF THE INVENTION

The present invention generally relates to the field of computer graphics, and more particularly relates to methods and apparatuses for performing window-relative dithering of pixel intensity data in a computer graphics system. A computer graphics system embodying the present invention comprises components that are related to the present invention in one way or another. These related components are described in the following copending applications, each of which is hereby incorporated by reference into the instant application:

Application Ser. No. 495,005, filed Mar. 16, 1990, entitled "Arithmetic And Logic Processing Unit For Computer Graphics System;" now U.S. Pat. No. 5,185,856.

Application Ser. No. 494,992, filed Mar. 16, 1990, entitled "Method And Apparatus For Pixel Clipping Source And Destination Windows In A Graphics System;" now abandoned and parent of application Ser. No. 07/803,742 which is U.S. Pat. No. 5,193,148.

Application Ser. No. 639,626, filed Jan. 19, 1991, entitled "Serpentine Rendering Of Antialiased Vectors;"

Application Ser. No. 641,976, filed Jan. 16, 1991, entitled "Z-interpolation Method And Apparatus;"

Application Ser. No. 644,188, filed Jan. 22, 1991, entitled "High Speed Method For Rendering Antialiased Vectors;" now U.S. Pat. No. 5,220,650.

Application Ser. No. 07/662,150 filed May 6, 1991, entitled "Programmable Depth Window Identity Mask;"

Application Ser. No. 07/670,552 filed Mar. 15, 1991, entitled "Apparatus For Rendering Antialiased Vectors;"

Application Ser. No. 07/669,801 filed Mar. 15, 1991, entitled "Data Rotator Means."

BACKGROUND OF THE INVENTION

The field of computer graphics concerns the creation, storage, manipulation and display of pictures and models of objects by a digital processor. Interactive computer graphics is the subclass of computer graphics in which a user dynamically controls the picture's content, format, size or color on a display surface by means of an interaction device such as a keyboard, lever or joystick. See *Fundamentals of Interactive Computer Graphics*, by J. D. Foley and A. Van Dam, ISBN: 0-201-14468-9. The creation of synthetic images (i.e., images which exist as abstract collections of lines, points, curves, etc., in the computer's memory) is the usual domain of interactive computer graphics.

The two primary classes of interactive computer graphics systems are random-scan and raster-scan systems. Images displayed by a random-scan system are encoded as commands to draw each output primitive (i.e., point, line or polygon) by plotting individual points or drawing connecting lines between specified starting and ending coordinates of line segments. Polygons are simply treated as a closed series of line segments. Encoding for a raster-scan system is much simpler: output primitives are broken up into their constituent points for display. The major difference between a simple point-plotting random-scan system and a raster-scan system is in the organization of the stored data used to drive the display. As explained below, the data is stored in a "frame buffer."

In the random-scan system the component points of each successive output primitive are stored sequentially in memory and plotted in the same order, one point at a time. This is because the beam may be moved randomly on the screen. In the raster-scan system the frame buffer memory is arranged as a 2-dimensional array of data. The value stored at a particular row and column encodes an intensity and/or color value of a corresponding display element on the screen. The location of each display element is typically specified by a unique (X,Y) coordinate. Since each memory location defines a single point-sized element of an image, both the display screen location and its corresponding memory location are often called a "pixel," short for "picture element." Hereinafter, to avoid confusion, the term "display pixel" will be used to indicate picture elements of a display device, and "storage pixel" to indicate memory locations corresponding to the display pixels. FIG. 1 is a simplified block diagram of a raster-scan graphics system 10, which includes an image creation system 12, an image storage system 14 (including a frame buffer), an image display system 16, a raster-scan display 18 and an interaction device 20. The image creation system 12 converts output primitives into the data stored in the frame buffer of the image storage system 14.

The use of color and gray scale has become an important part of modern computer graphics. The proper use of color is extremely complex because the color of an object depends not only on the object itself, but also on the light source illuminating the object and on the human visual system. Moreover, some objects only reflect light while other objects also transmit light. An observer of achromatic light does not experience any of the color sensations associated with red, blue, yellow, etc. Achromatic light is what is seen on a black and white television. The only attribute of achromatic light is its intensity. Intensity is typically represented with a scaler, e.g., 0 for black, 1 for white and 0.5 for medium gray. A black and white television can produce many different levels of gray at a single pixel position. Line printers, pen plotters and electrostatic plotters produce only two levels, the white of the paper and the black of the ink or toner deposited on the paper. A concern in computer graphics is how many intensity levels are "enough" to adequately represent an image; e.g., how many intensity levels are needed to reproduce a continuous-tone black and white photo in such a way that the reproduction appears to be continuous.

Many displays and hard-copy devices produce just two intensity levels (i.e., are "bilevel"), and even two or three bits-per-pixel raster displays produce fewer intensity levels than are often desired; however the range of available intensities is expanded through the spatial integration our eyes perform on the image. If a very small area, e.g. a 0.02×0.02 inch square, is viewed from a normal viewing distance, the eye will integrate fine detail within the small area and record only the overall intensity of the area. This phenomenon is used in printing black and white photos in newspapers, magazines and books, in a technique called "half toning," whereby each small resolution unit is imprinted with a circle of black ink whose area is proportional to the blackness of the area of the original photo. See *Fundamentals of Interactive Computer Graphics*, referenced above, pages 597–601.

Graphics output devices can approximate the variable-area dots of half tone reproduction. E.g., a 2×2 pixel area of a bilevel display can be used to produce five different intensity levels at the expense of cutting the spatial resolution in half along each axis. The patterns shown in FIG. 2A can be used in the 2×2 areas. The patterns fill each 2×2 area with a number of dots proportional to the desired intensity. In FIG. 2A the numerals inside the boxes represent the intensity I for the respective areas. In general, an N×N group of bilevel pixels can provide $N^2+1$ intensity levels. Spatial resolution, which is decreased, is in effect traded for intensity resolution, which is increased. The use of a 3×3 pattern reduces spatial resolution by a factor of ⅓ on each axis, but provides ten intensity levels. Of course even larger patterns can be used, but the spatial versus intensity resolution trade-off is limited by the human eye's visual acuity (about one minute of arc in normal lighting).

The N×N pixel patterns used to approximate the half tones must be designed so that they are not conspicuous in an area of identical intensity values. For example, if the pattern shown in FIG. 2B were used, horizontal lines would be visible in any large area of the image that has intensity I equal to 3. Another consideration in choosing patterns is that they form a "growth sequence," in which a pixel that is intensified for intensity level J is intensified for all levels K greater than J. This minimizes the differences in the patterns for successive intensity levels, thereby minimizing the contouring effects.

Half tone approximation is not limited to bilevel displays. If a display has two bits per pixel, and thus four intensity levels, the half tone technique may be used to further increase the number of intensity levels. If a 2×2 pattern is used, a total of four pixels, each of which can take on three intensity values besides black, is available, allowing the display of 4×3+1=13 intensity levels. One possible set of growth sequence patterns for this case is shown in FIG. 2C. The respective intensities of the individual pixels sum to the intensity level I shown below each pattern.

The above techniques are appropriate if the resolution of the image to be displayed is lower than the resolution of the display device, allowing the use of multiple display pixels for one image pixel. If the image resolution and device resolution are the same, the "ordered dither" technique can be used to display an M×M image with multiple levels of intensity on an M×M bilevel display. In the ordered dither technique, the decision to intensify or not intensify the pixel at position (X,Y) depends on the desired intensity I(X,Y) at that point and on an N×N dither matrix $D^N$. The dither matrix $D^N$ is indexed from 0 to N−1 along its rows and columns. Each of the integers 0 to $N^2-1$ appears once in the matrix. For example, when N=2, $D^2$ is given by $$D^2 = \begin{bmatrix} 0 & 2 \\ 3 & 1 \end{bmatrix}$$

To process the pixel at (X,Y), the dither matrix index values i, j are computed as follows:

$$i = X\ modulo-N,\ j = Y\ modulo-N.$$

Then if I(X,Y) is greater than $D_{ij}^N$, the pixel at (X,Y) is intensified; otherwise it is not. The above techniques are discussed at pages 597–601 of *Fundamentals of Interactive Computer Graphics*, referenced above, and references cited therein.

Dithering thus has the effect of smoothing out the transition between two intensity levels. Circuitry for carrying out this dithering typically includes means for comparing the least significant part (e.g., the least significant nibble (LSN)) of the rendered intensity with a value stored in the dither cell at a row and column determined in accordance with the pixel sub-address (i.e., the fractional part of the pixel address). If the least significant part is greater than the dither cell value, then the most significant part (e.g., the MSN) of the rendered intensity is incremented. For example, consider a rendered image with eight-bit intensity values and a frame buffer having four bits per color. An exemplary dither cell is the 4×4 dither cell having the randomized values shown in FIG. 3. The LSNs of the rendered pixels define sixteen intensity levels with values from 0 to 15 which match the sixteen dither cell entries. The least significant two bits of both the X address and Y address of the pixel are used to select the cell value to be compared. The dither algorithm may be simply stated as follows: If $I_{LSN}$ is greater than D(X,Y), then $I_{MSN}=I_{MSN}+1$, where $I_{LSN}$ is the intensity value's least significant nibble, $I_{MSN}$ is the intensity value's most significant nibble and D(X,Y) is the dither cell value selected in accordance with the subaddresses of X and Y.

Exemplary circuitry for carrying out the dither algorithm is represented by the block diagram shown in FIG. 4. As shown, dither cell values D(X,Y) output from a dither matrix storage device 26 are input to a compare circuit 24. The dither cell values are compared with corresponding parts of input intensity values,, e.g., with the LSNs of corresponding input intensity values. If the LSN of an intensity value is greater than the dither cell value it is compared with, the MSN of that intensity value is incremented in adder 22 and combined with the LSN to form the output intensity value. In the prior art, most dither circuits use fixed or "hard wired" dither cell values. In addition, most prior art dither circuits have their row-column addresses fixed to corresponding (X,Y) screen addresses. These limitations create problems when the applications program employs windowing, since the pixel coordinates employed in most computations are window-relative as opposed to screen-relative. A further problem with known dither circuits is that their output intensities "wrap" to a low value when the input intensity is at a maximum.

SUMMARY OF THE INVENTION

Accordingly, an object of the present invention is to provide a dither circuit that can perform window-relative, as opposed to screen-relative, dithering. A further object of the present invention is to provide a dither circuit which does not allow the intensity values to wrap to a low intensity when a high intensity is desired; i.e., the dithered intensities should saturate at the highest intensity. The present invention achieves these goals.

Preferred embodiments of the invention include a programmable dither cell, a dither circuit for performing window-relative dithering employing a programmable dither cell in accordance with the invention, and a computer graphics system employing a dither circuit in accordance with the invention.

A programmable dither cell embodying the present invention comprises means for receiving first and second window-relative coordinate values, means for receiving first and second transform values, means for programmatically storing dither values, and means for reading/writing the dither values from/to respective row-column addresses (i,j) of the dither value storage means, the row-column addresses determined as a function of the window-relative values and the first and second transform values.

A dither circuit embodying the present invention comprises a programmable dither cell in accordance with the above description, and compare means, comprising a first input terminal coupled to the programmable dither cell and a second input terminal for receiving a first part of an intensity value I(X,Y), for comparing a dither value received from the dither cell with the first part and outputting an increment signal in accordance with the comparison. In a preferred embodiment, a dither circuit according to the present invention further comprises means for receiving a second part of the intensity value and determining whether the second part would overflow if incremented and, if not, outputting the increment signal, and means for incrementing the second part in accordance with the increment signal.

A computer graphics system according to the present invention comprises an image creation system for generating pixel data, including pixel intensity values, a frame buffer for storing the pixel data, a display comprising a plurality of display pixels each of which is adapted to display data stored in an associated one of the storage pixels, and a dither circuit in accordance with the foregoing description.

The present invention also provides methods carried out by each of the above apparatuses.

BRIEF DESCRIPTION OF THE DRAWINGS

FIG. 3 depicts an exemplary prior art dither cell pattern for a 4×4 dither cell.

FIG. 4 is a block diagram of a dither circuit.

FIG. 5 is a block diagram of a dither circuit in accordance with the present invention.

DETAILED DESCRIPTION OF THE PREFERRED EMBODIMENTS

Figure 1:
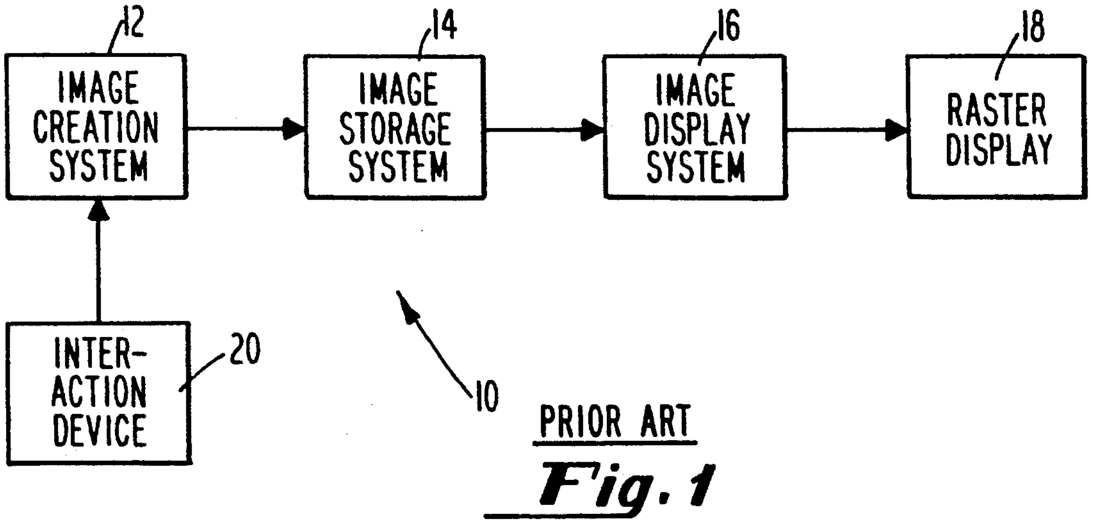
PRIOR ART Fig. 1
FIG. 1 is a block diagram of an interactive computer graphics system.
Figure 2:
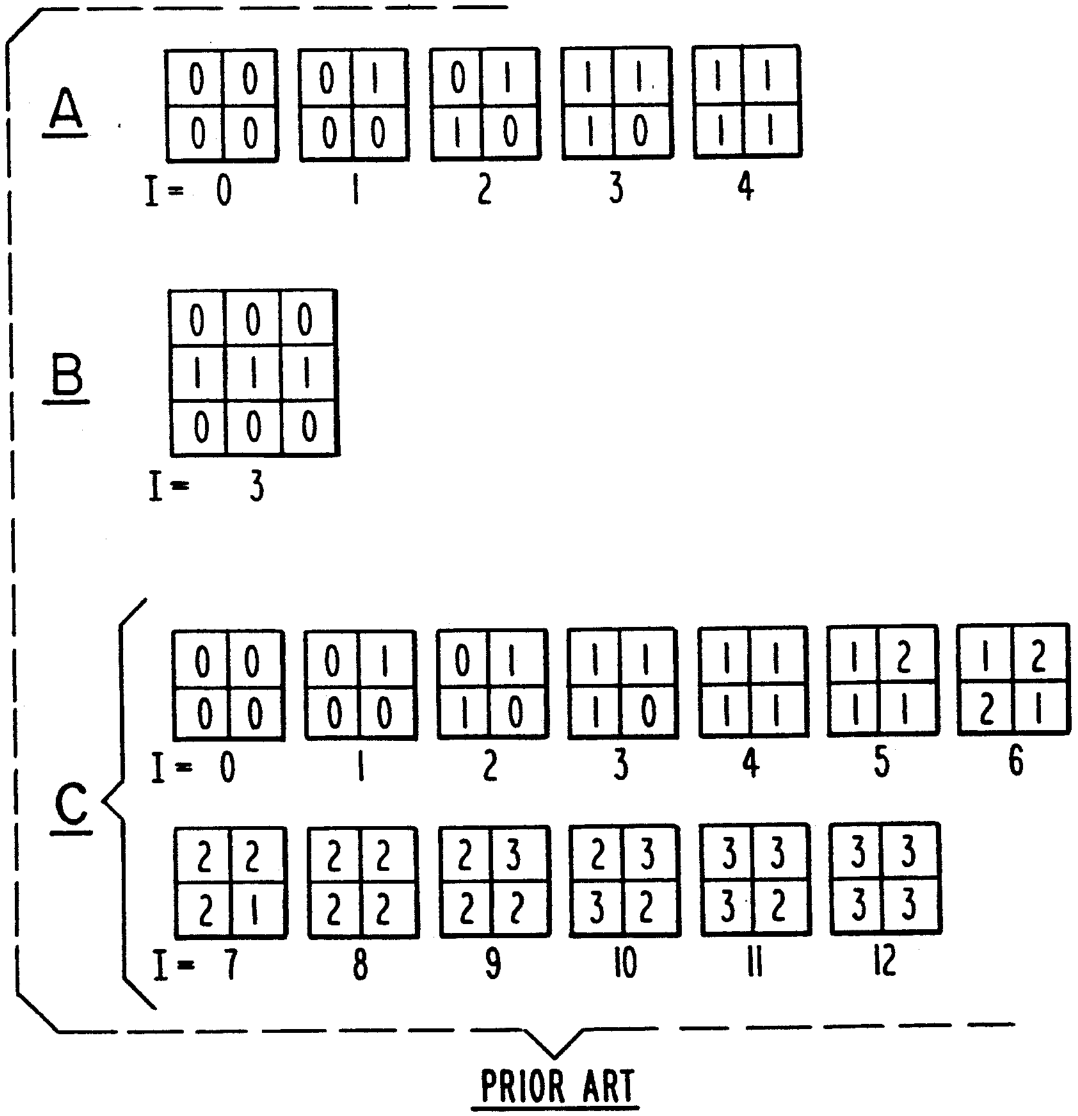
PRIOR ART Fig. 2
FIGS. 2A-2C depict exemplary prior art dither cell patterns.

Referring now to FIG. 5, a dither circuit 50 in accordance with the present invention comprises a programmable dither cell 30, a compare circuit 24a, a wrap prevention circuit 28 and an adder 22, as shown. Dither circuit 50 has the capability of performing window-relative dithering of intensity values and preventing the dithered intensity values from wrapping to a low value. The programmable dither cell 30 receives window-relative pixel coordinates ($X_W$, $Y_W$) and converts these coordinates to screen-relative coordinates (X,Y). The conversion to screen-relative coordinates (X,Y) is accomplished by, e.g., adding an offset value $X_O$ (input at terminal 32a) to $X_W$ and an offset value $Y_O$ (input at terminal 34a) to $Y_W$, and in some cases multiplying by an appropriate scaling factor. In the present example the scaling factor is assumed to be unity. $X_O$ and $Y_O$ correspond to the origin (i.e., address of a corner) of a window in which the pixel to be dithered is located. $X_O$, $Y_O$ may be dynamically changed by the applications program. In addition, as explained below with reference to FIG. 6, the stored dither cell values may be programmatically changed by the applications program.

To change the values stored in the dither cell 30, the applications program provides a write signal ("WRITE") and the new value(s) $D'_{ij}$ to be stored. To output the stored dither cell values $D_{ij}$ to compare circuit 24a, the applications program transmits a read signal ("READ") to dither cell 30, which signal causes dither cell 30 to output a value $D_{ij}$ in accordance with the window-relative coordinates ($X_W$, $Y_W$) and offset coordinates ($X_O$, $Y_O$), as explained more fully below. (Note that more specific circuitry for carrying out the above-described functions is illustrated in FIGS. 8A-14.) Next, compare circuit 24a compares dither cell value $D_{ij}$ with the LSN of an intensity value to be dithered ("$I_{LSN}$") If $I_{LSN}$ is greater than $D_{ij}$, an increment signal ("INC") is transmitted to wrap prevention circuit 28. Wrap prevention circuit 28 examines the MSN of the intensity ("$I_{MSN}$") and, if there is the possibility of a wrap (e.g., if $I_{MSN}$="1111" (for 4-bit nibbles)), inhibits or overrides the increment signal to prevent adder 22 from incrementing $I_{MSN}$. If there is no possibility of a wrap, adder 22 receives $I_{MSN}$ and increments it or does not increment it depending upon the state of INC. The output intensity is denoted "I(X,Y)."

Figure 6:
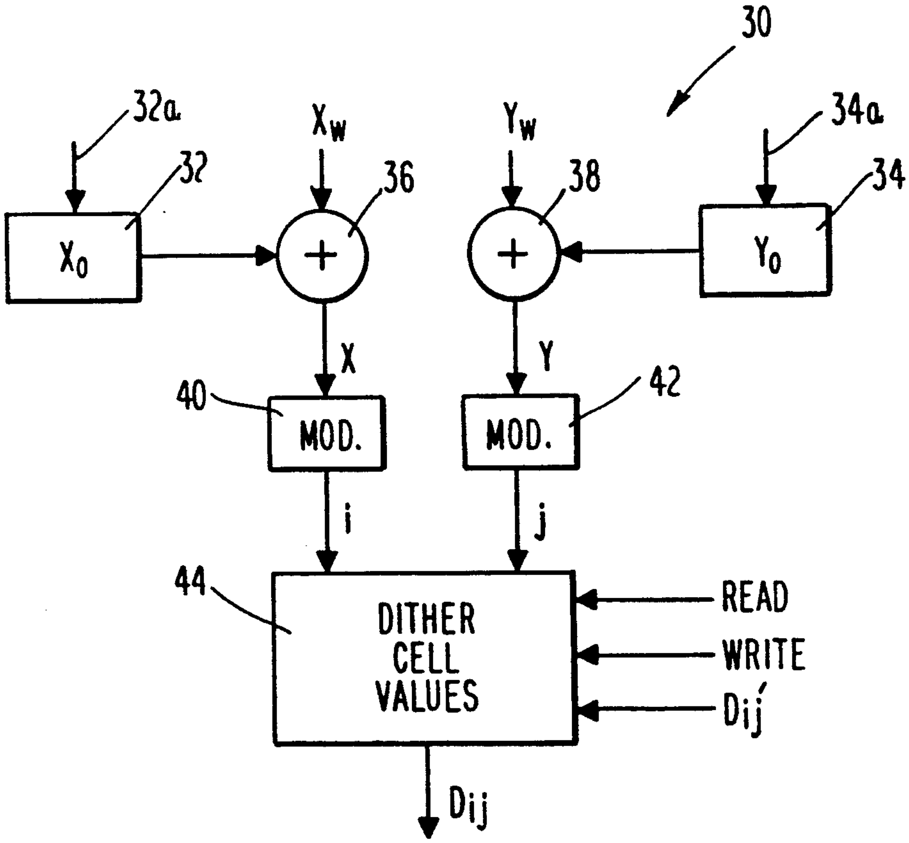
FIG. 6 is a functional block diagram of a programmable dither cell in accordance with the present invention.

Referring now to FIG. 6, a functional block diagram of programmable dither cell 30 includes adder 36 for adding offset value $X_O$ (or $-X_O$), which is stored in register 32 by way of terminal 32a, to window-relative value $X_W$ to produce screen-relative value X. In like fashion adder 38 and register 34 cooperate to produce screen-relative value Y from $Y_W$ and $Y_O$. As mentioned above, additional circuitry could also be added for scaling X and Y to compensate for any difference in the respective sizes of the window and screen. Thus X and Y are given by: $X=X_O+X_W$, $Y=Y_O+Y_W$. Row and column index numbers i, j are determined by their respective modulo circuits 40, 42 in accordance with the equations: i=X modulo-N, j=Y modulo-N, where the modulus N is equal to the number of rows and columns of dither cell values and $N^2$ is equal to the number of dither cell values. For example, a 4-bit nibble can represent $2^4$ or 16 different intensity values, so N would equal 4 in this case. The indices i and j are used to access the values $D_{ij}$ stored the ith row and jth column of a dither cell storage matrix 44.

Figure 7:
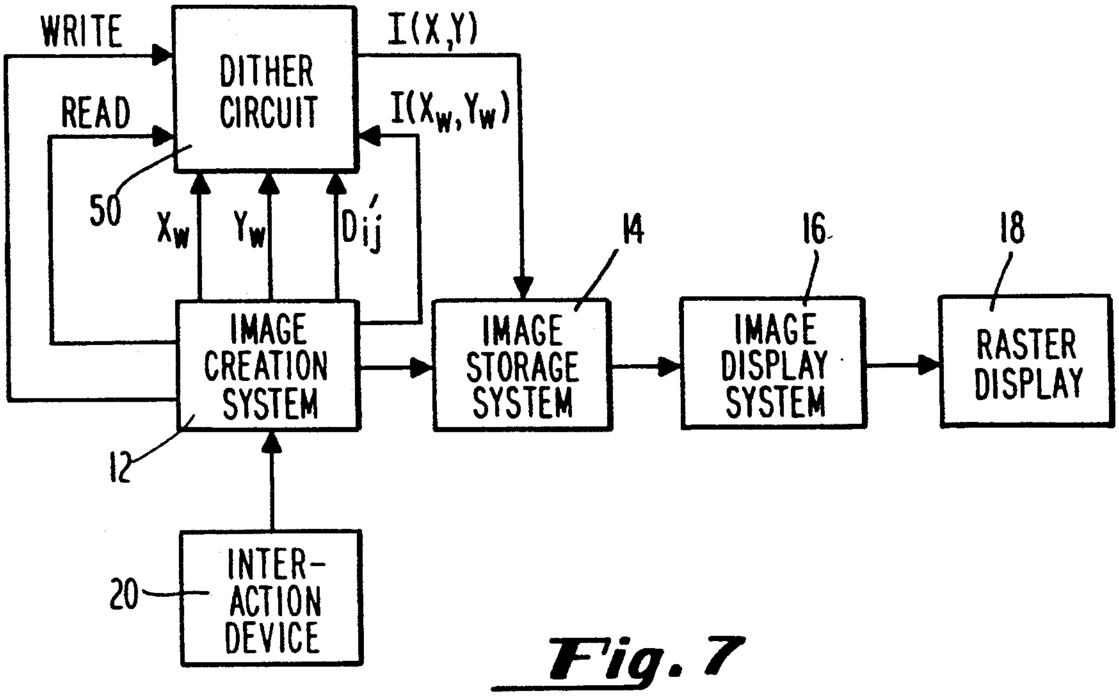
FIG. 7 is a block diagram of an interactive computer graphics system in accordance with the present invention.

Referring now to FIG. 7, an interactive computer graphics system embodying the present invention includes the image creation system 12, image storage system 14, image display system 16, raster display 18 and interaction device 20 described above in the "Background of the Invention" section. The system also includes a dither circuit 50 coupled to (or part of) image creation system 12. In this embodiment, image creation system 12 passes window-relative intensity values I ($X_W$, $Y_W$) through dither circuit 50 before they are stored in image storage system 14.

Figure 8A:
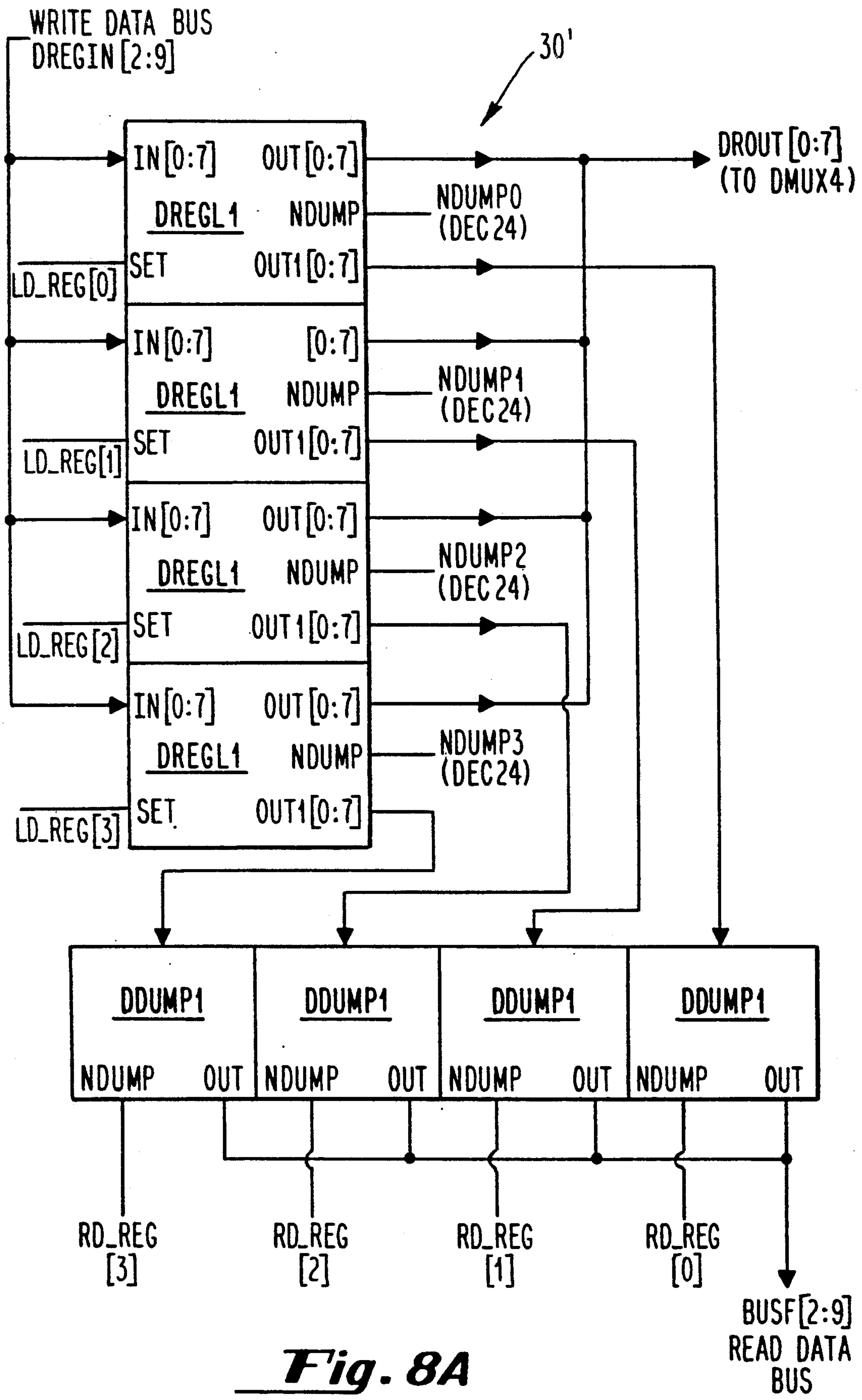
FIGS. 8A and 8B are a top level block diagram of specific circuitry implementing dither circuit 50 of FIG. 5.
Figure 8B:
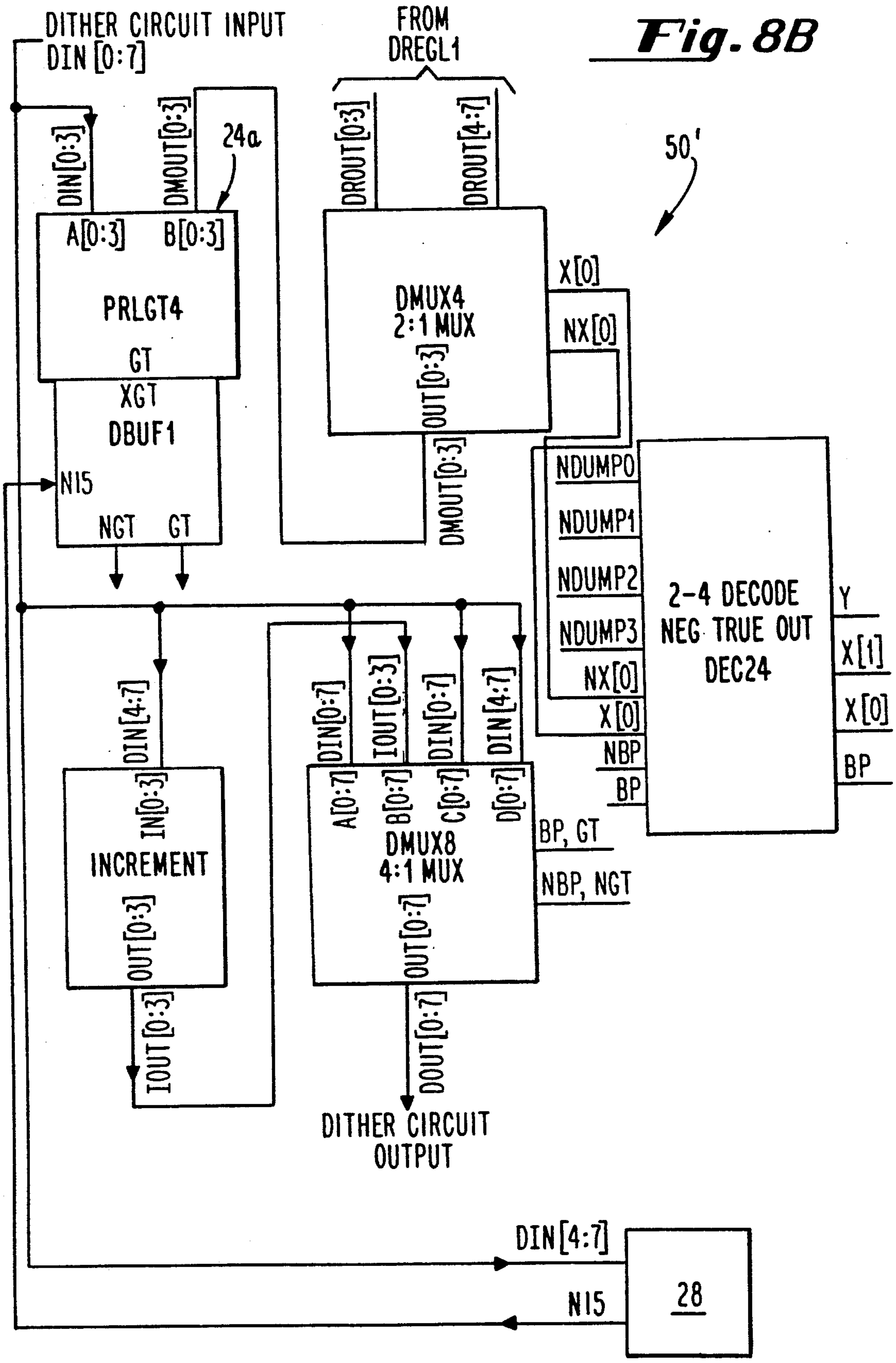
Figure 9:
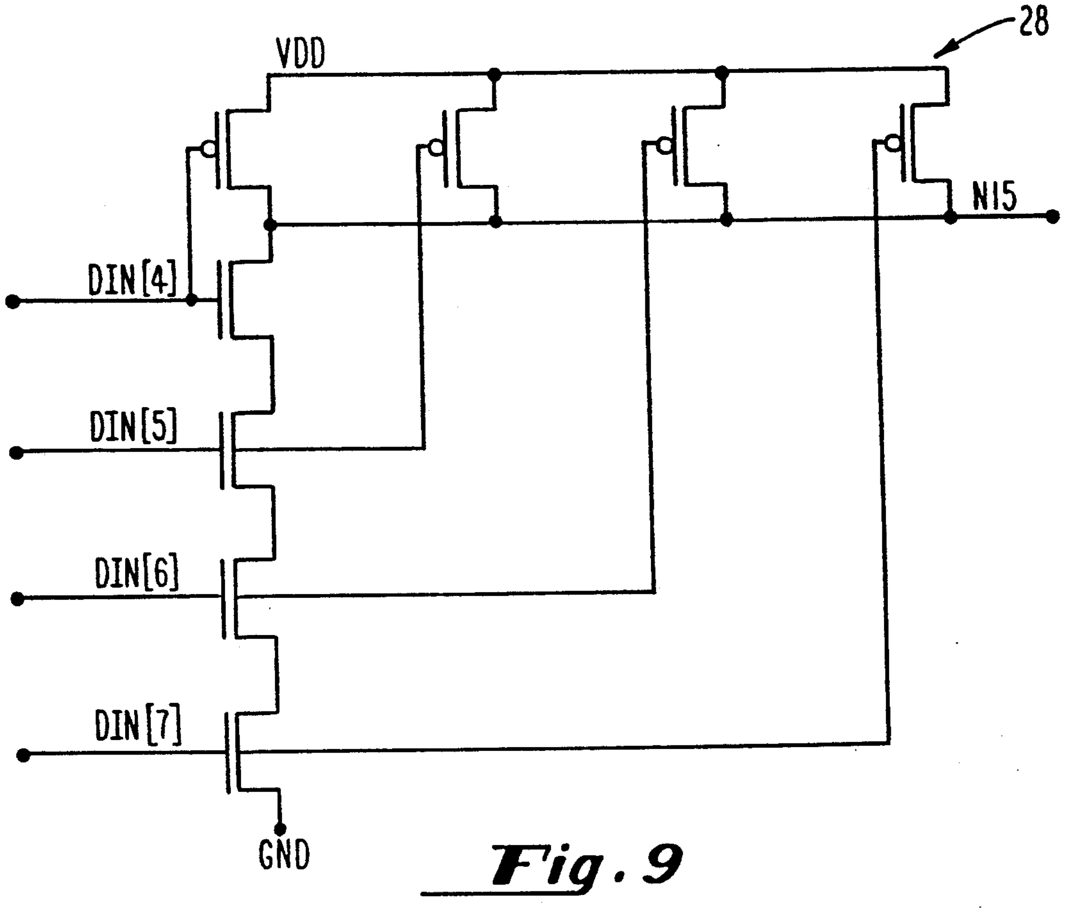
FIG. 9 is a schematic diagram of the specific wrap prevention circuit 28 of FIG. 8B.

FIGS. 8A and 8B depict a high level block diagram of a specific implementation of a dither circuit 50'. This circuitry is more specific than and therefore different from the circuitry depicted in FIG. 5; however, like reference numerals are used to indicate blocks performing like functions. The alphanumeric labels on the nodes of the several circuits identify nodes that are coupled together; i.e., all nodes with like labels are coupled to one another. In this way, the interconnection of the blocks may be indicated without actually showing the interconnecting conductors, which would unnecessarily clutter the drawing.

The dither cell 30' in FIG. 8A comprises four registers labelled "DREGL1," each of which includes eight input lines "IN[0:7]" and eight pairs of output lines "OUT[0:7]" and "OUT1[0:7]." The DREGL1 blocks have control input signals labelled "LD—REG[0:3]," i.e., each DREGL1 block is controlled by one of LD—REG[0], LD—REG[1], . . . LD—REG[3]. In addition, the DREGL1 blocks receive control inputs "NDUMP0" to "NDUMP3" from decoder block "DEC24" of FIG. 8B. The NDUMP0–NDUMP3 control signals control the movement of data from the DREGL1 blocks to the "DMUX4" block (see FIG. 8B), which is discussed below. LD—REG[0]—LD—REG[3] and RD—REG[0]—RD—REG[3] are generated by a system controller which is not considered part of the invention and is therefore not shown in the drawings. NDUMP0–NDUMP3 are generated by "DEC24" (see FIG. 8B), which is discussed below.

Figure 11:
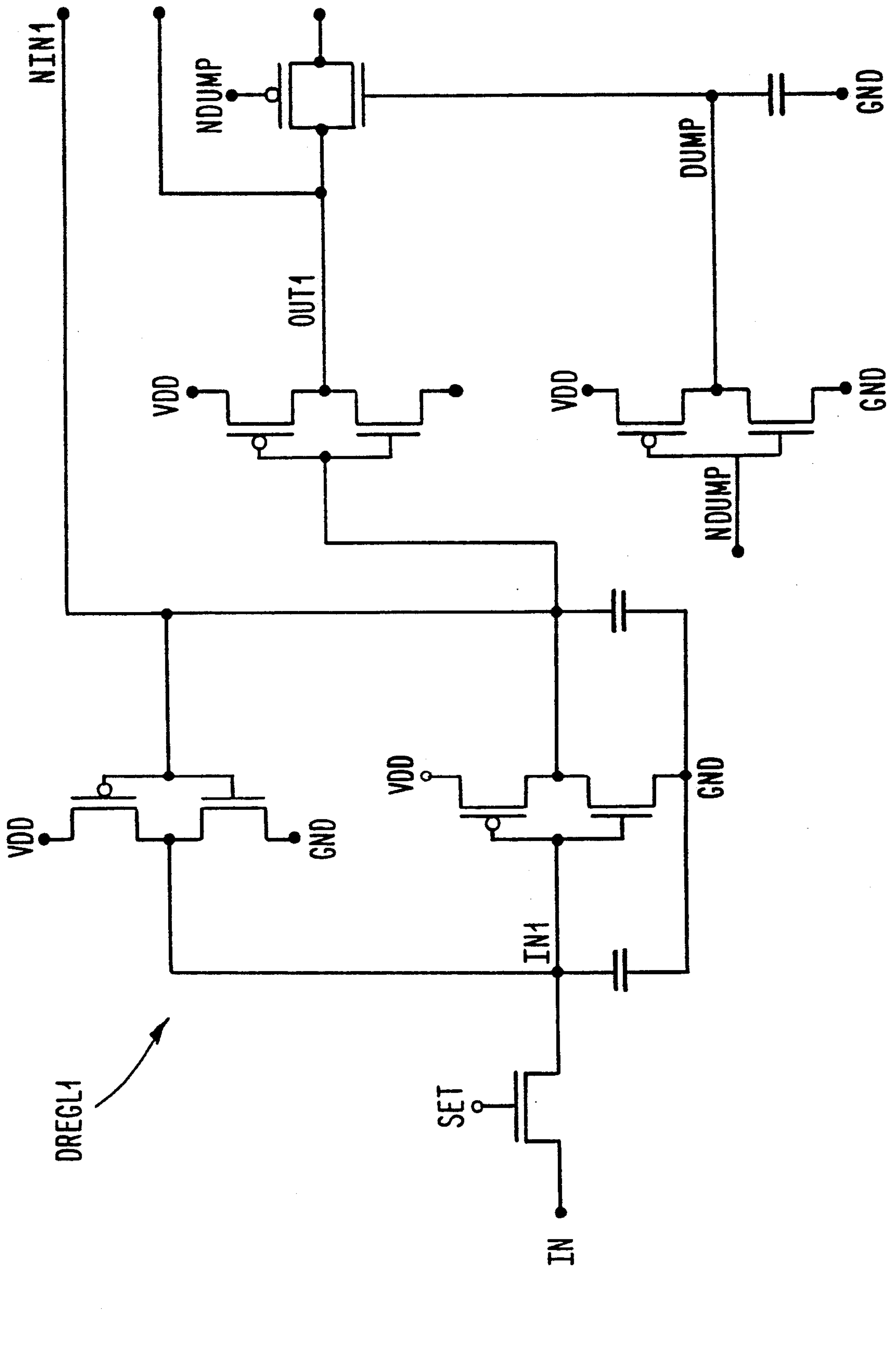
FIG. 11 is a partial schematic diagram of the "DREGL1" block of FIG. 8A.

Each DREGL1 block contains the circuitry depicted in FIG. 11 for each of its eight respective input lines and eight pairs of output lines; thus "IN", "OUT" and "OUT1" are used in FIG. 11 to represent any one input line and corresponding pair of output lines.

Figure 12:
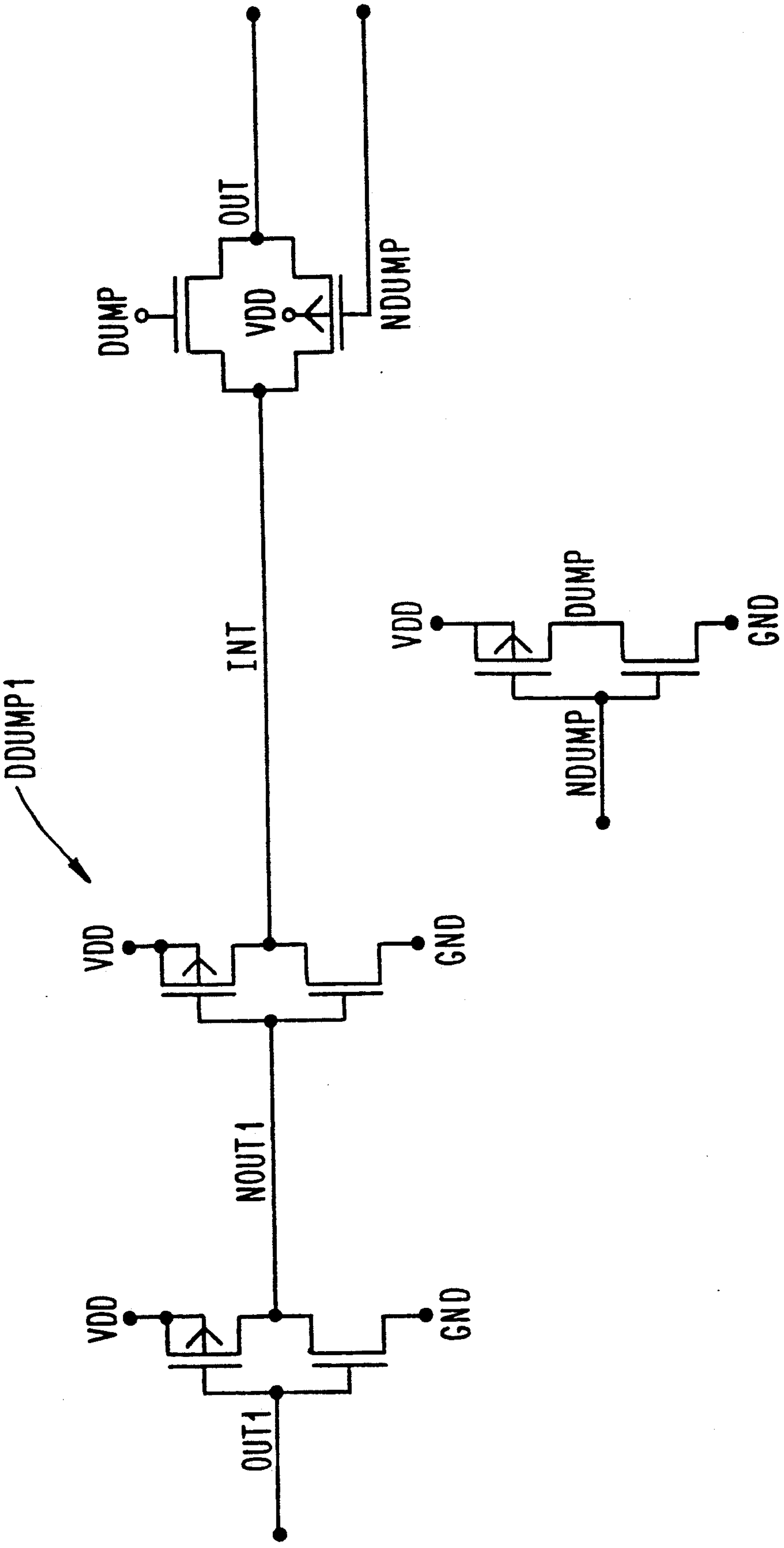
FIG. 12 is a partial schematic diagram of the "DDUMP1" block of FIG. 8A.

The blocks labelled "DDUMP1" in FIG. 8A are for moving (or "dumping") the contents of their corresponding DREGL1 blocks onto the read data bus "BUSF[2:9]." The respective control inputs of the DDUMP1 blocks, labelled "RD—REG[O]," "RD—REG[1]," . . . "RD—REG[3]," initiate transfer of data from their corresponding DDUMP1 blocks to the read data bus "BUSF[2:9]." Each DDUMP1 block contains the circuitry depicted in FIG. 12 for each of its OUT1 input lines. The specific components symbolically depicted in FIGS. 11 and 12 are well known, thus they will not be described in detail except to say that the FET symbols with the arrow opposite the gate represent PFETs and the FET symbols without the arrow represent NFETS. Input data to be stored in the dither cells is carried on the write data bus "DREGIN[2:9]."

FIG. 8B depicts the compare circuit 24*a*, comprising the two blocks labelled "PRLGT4" and "DBUF1," adder 22, labelled "INCREMENT," wrap prevention circuit 28, and additional blocks labelled "DMUX4," "DMUX8" and "DEC24." PRLGT4 receives the LSN (bits 0–3) of the input intensity value "DIN[0:3];" its output "GT" is high if DIN[0:33] is greater than "DMOUT[0:3]," the other input to PRLGT4. DMOUT[0:3] is the output from the DMUX4 block, a 2:1 multiplexer (or "mux"). DMUX4 selects as its output either the MSN or LSN of the DROUT[0:7] output from the DREGL1blocks; the LSN is selected if "X[O]" is low and the MSN is selected if X[0] is high. X[0] is a control signal derived from the address input to the dither circuit (i.e., it is part of the index i discussed above) and passed through DEC24 to DMUX4.

The output GT of DBUF1 is provided as a control signal, along with bypass signal "BP" to the "DMUX8" block, a 4:1 mux. DMUX8 selects as its output either one of the signals "DIN[0:7]" (both nibbles of the input intensity), "IOUT[0:3]" (the MSN of DIN after being incremented by the INCREMENT block) or DIN[4:7] (the MSN of the input intensity). The output of DMUX8 "DOUT[0:7]" is the output intensity value of the dither circuit, i.e., the signal corresponding to I(X,Y) in FIG. 5.

Several other points about FIG. 8B should be noted: First, the signal "N15" from wrap prevention circuit 28 forces GT low, which in turn causes DMUX8 to select as its output the unincremented value of the MSN of DIN. In addition, the bypass signal BP from DEC24 causes DMUX8 to select as its output DIN[0:7], thus causing the dither circuit to be effectively bypassed. Although BP and X[0] appear to be generated by decoder block DEC24, this is not the case; in fact, these signals are generated by a system controller (not shown) which is not part of the present invention. Lastly, the signals "NX[0," "NBP" and "NGT" are inverted versions of X[0], BP and GT.

Figure 10:
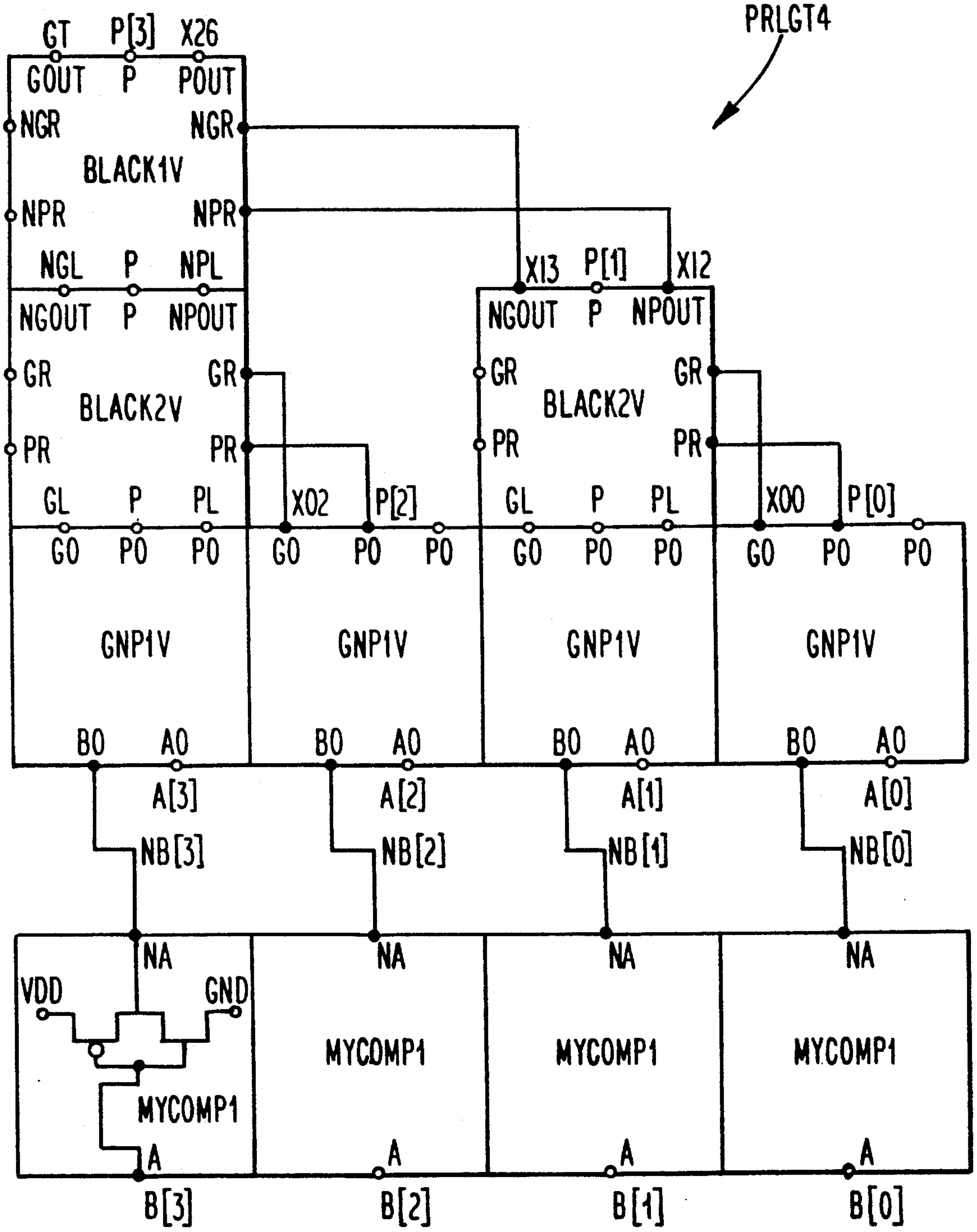
FIG. 10 is a top level block diagram of specific circuitry implementing compare circuit 24a (PRLGT4) of FIG. 8B.
Figure 10A:
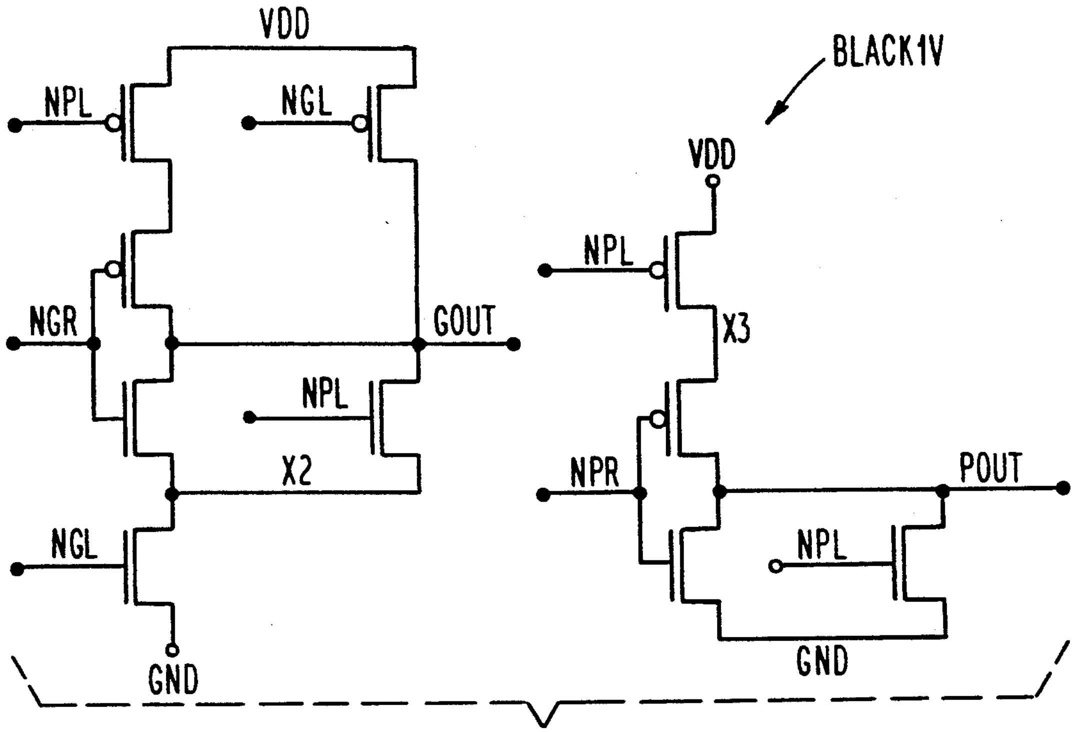
FIG. 10A is a schematic diagram of the "BLACK1V" block of FIG. 10.
Figure 10B:
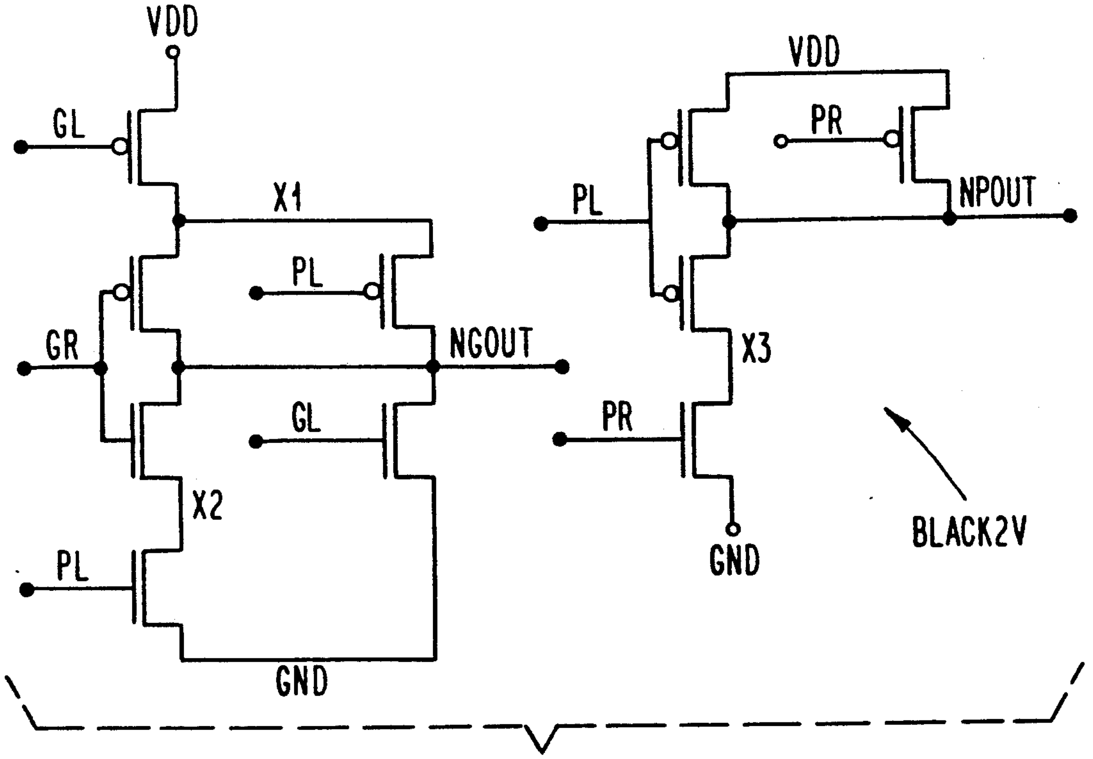
FIG. 10B is a schematic diagram of the "BLACK2V" block of FIG. 10.
Figure 10C:
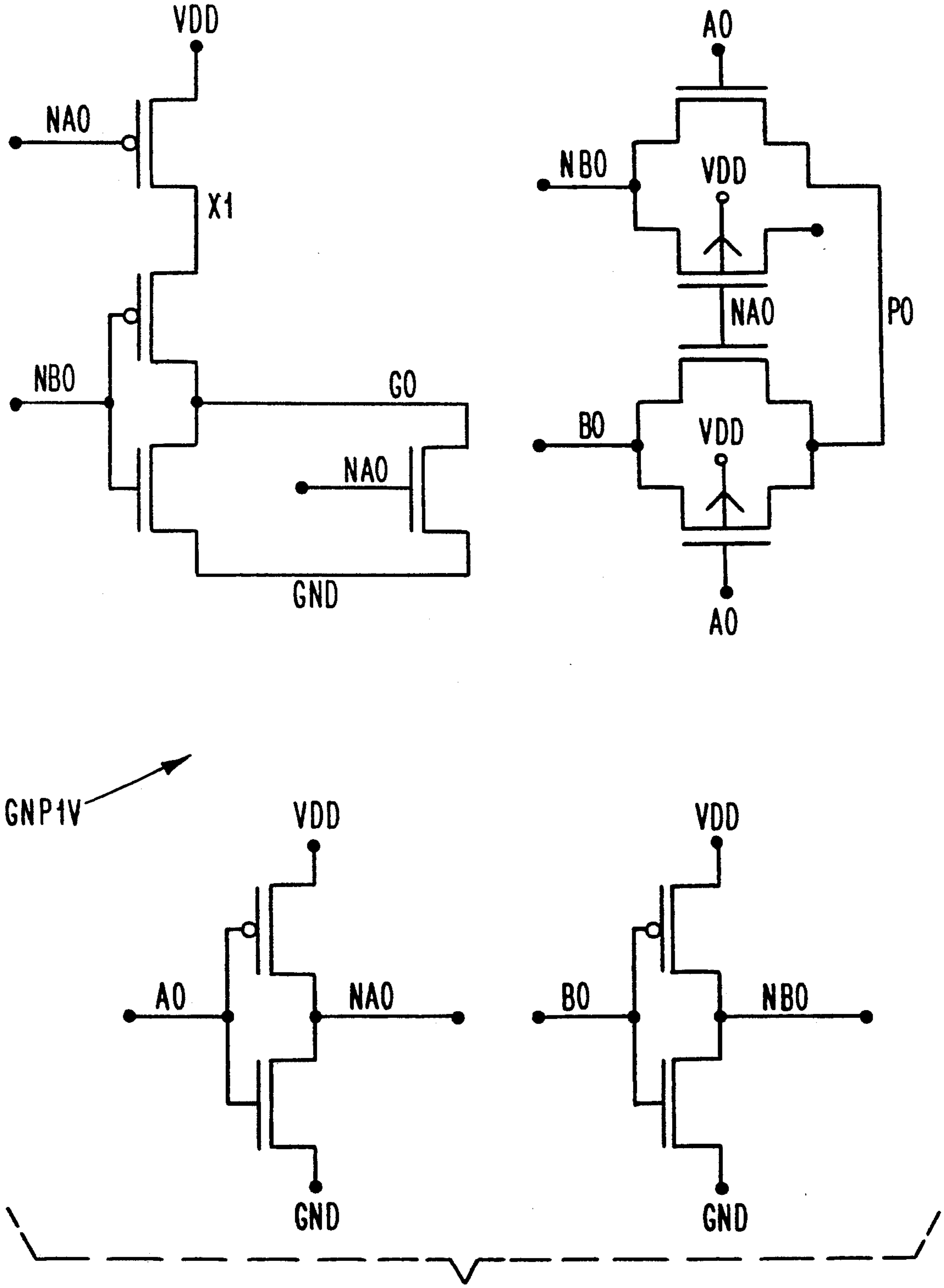
FIG. 10C is a schematic diagram of the GNP1V block of FIG. 10.

FIG. 10 depicts the blocks that make up PRLGT4 (which is part of compare circuit 24*a*). PRLGT4 comprises four types of blocks, labelled "MYCOMP1," "GNP1V," "BLACK2V" and "BLACK1V." The circuitry inside each MYCOMP1 block is shown in FIG. 10 inside the MYCOMP1 block furthest to the left of the drawing. The circuitry making up each BLACK1V block is depicted in FIG. 10A, the circuitry making up each BLACK2V block is depicted in FIG. 10B, and the circuitry making up each GNP1V block is depicted in FIG. 10C.

Figure 13:
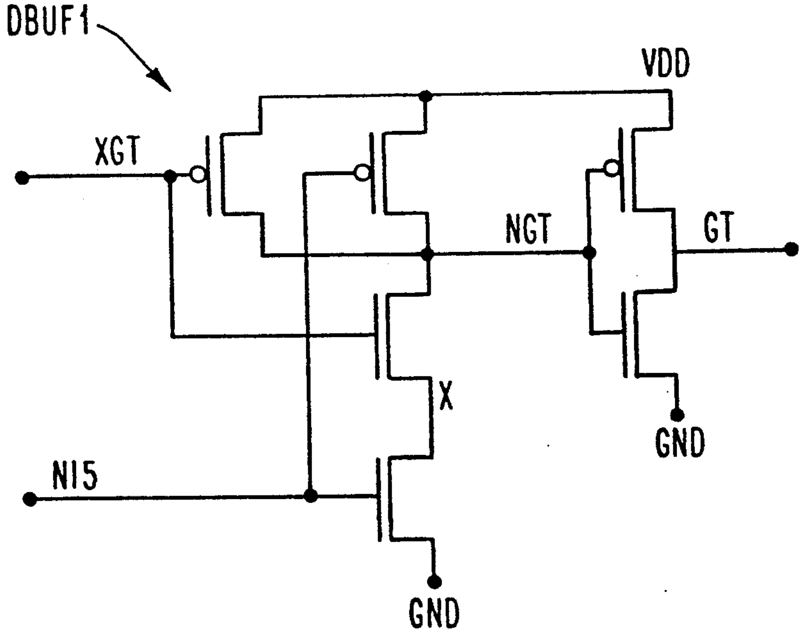
FIG. 13 is a schematic diagram of the "DBUF1" block of FIG. 8B.

FIG. 13 shows the circuitry inside DBUF1, which together with PRLGT4 composes circuit 24*a*. All of the circuit components in FIGS. 10A, 10B, 10C and 13 are well known.

Figure 14:
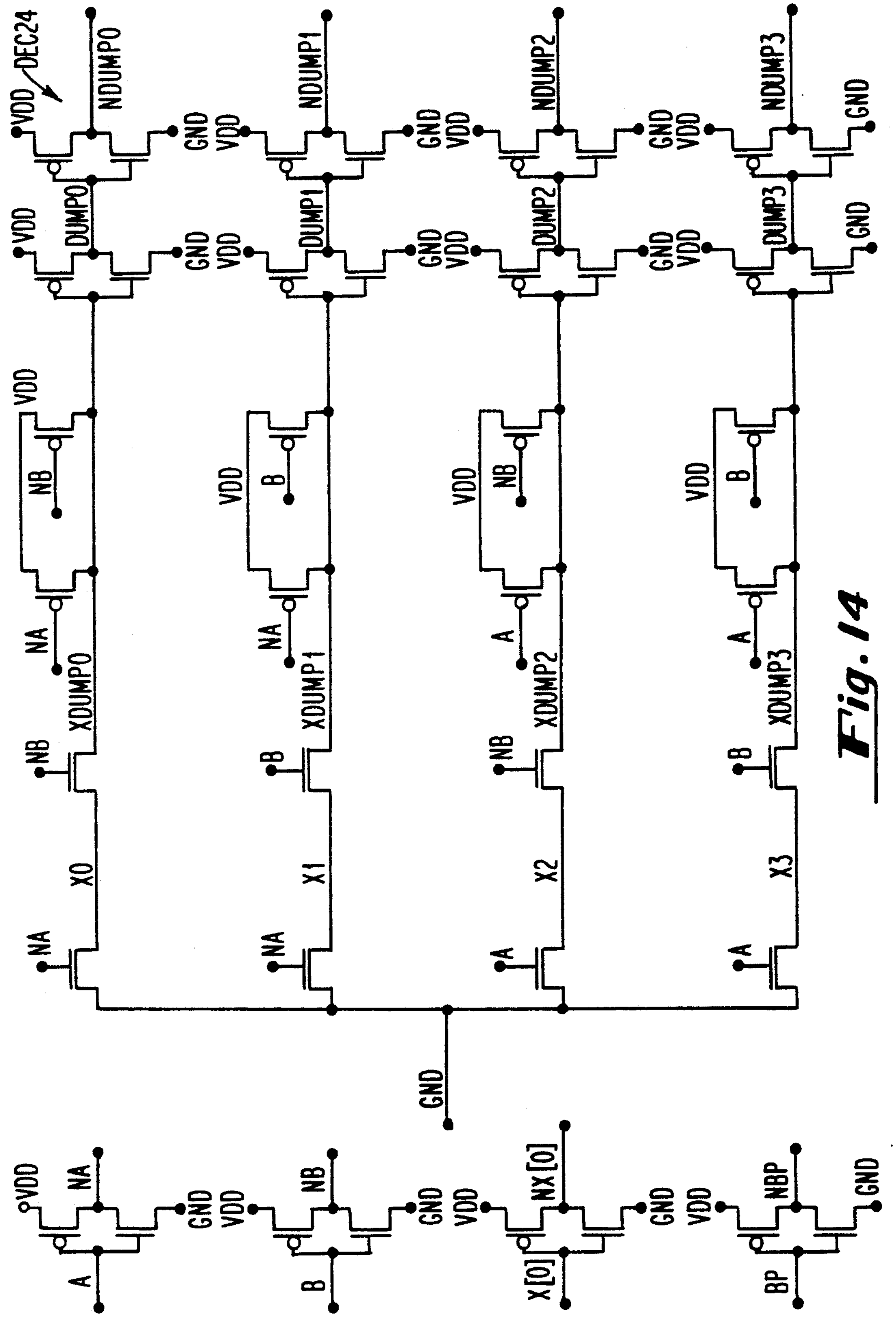
FIG. 14 is a schematic diagram of the "DEC24" block of FIG. 8B.

FIG. 14 depicts the circuitry making up DEC24, a 2 to 4 bit decoder circuit. The outputs of this circuit are defined as: NDUMP0=NA*NB, NDUMP1=NA*B, NDUMP2=A*NB, and NDUMP3=A*B, where A, B, NA and NB are inputs from the system controller mentioned above. Note that A and B correspond to the signals "Y" and X[1] depicted in FIG. 8B; NA and NB are the respective complements (or inverses) of A and B.

Although specific embodiments of the invention have been described, it is recognized that many variations of these embodiments still within the true spirit and scope of the invention will be apparent to those skilled in the art. For example, the true scope of the invention is not limited to any specific circuitry (including the circuitry depicted in FIGS. 8A-14) for carrying out the respective functions of blocks 30, 24a, 28 or 22 of FIG. 5.

What is claimed is:

1. A dither circuit, comprising:

(a) a programmable dither cell comprising:

(i) input means for receiving first and second window-relative coordinate values, said window-relative coordinate values defining a location relative to a predefined point in a window of a display;

(ii) transformation input means for receiving first and second transformation values;

(iii) dither value storage means, coupled to said input means and said transformation input means, for programmatically storing dither values; and (iv) read/write means for reading/writing said dither values from/to respective row-column addresses of said dither value storage means, said row-column addresses determined as a function of at least said window-relative coordinate values and said first and second transformation values;

(b) compare means, comprising a first input terminal coupled to said programmable dither cell and a second input terminal for receiving a first part of an intensity value represented as a digital word comprising said first part and a second part, for comparing a dither value received from said dither cell with said first part and outputting an increment signal in accordance with said comparison;

(c) wrap prevention means comprising a first terminal coupled to said compare means and a second terminal adapted to receive said second part of said intensity value, for determining whether said second part would overflow if incremented and, if not, outputting said increment signal; and (d) adder means, coupled to said wrap prevention means, for receiving said increment signal and said second part and incrementing said second part in accordance with said increment signal.

2. The dither circuit recited in claim 1, wherein said read/write means comprises means for adjusting said window-relative values in accordance with said transformation values to produce screen-relative values.

3. The dither circuit recited in claim 2, wherein said read/write means further comprises means for receiving said screen-relative values and determining row and column indices (i,j) in accordance with the relation: i=X modulo-N and j=Y modulo-N, where N represents the number of rows and columns in said dither value storage means and X and Y represent said screen-relative values.

4. A computer graphics system, comprising:

(a) an image creation system for generating pixel data, said pixel data including pixel intensity values represented as digital words comprising a first part and a second part;

(b) a frame buffer, coupled to said image creation system, comprising a plurality of storage pixels for storing said pixel data;

(c) a display, coupled to said frame buffer, comprising a plurality of display pixels each of which is adapted to display data stored in an associated one of said storage pixels; and (d) dither means, coupled to said image creation system, for dithering said intensity values, said dither means comprising:

(i) a programmable dither cell for programmatically storing dither values, said dither cell comprising: (1) input means for receiving first and second window-relative coordinate values, said window-relative coordinate values defining a location relative to a predefined point in a window of the display; (2) transformation input means for receiving first and second transformation values; (3) dither value storage means, coupled to said input means and said transformation input means; and (4) read/write means for reading/writing said dither values from/to respective row-column addresses of said dither value storage means, said row-column addresses determined as a function of at least said window-relative coordinate values and said first and second transformation values;

(ii) compare means, comprising a first input terminal coupled to said programmable dither cell and a second input terminal for receiving a first part of an intensity value, for comparing a dither value received from said dither cell with said first part and outputting an increment signal in accordance with said comparison;

(iii) wrap prevention means comprising a first terminal coupled to said compare means and a second terminal adapted to receive a second part of said intensity value, for determining whether said second part would overflow if incremented and, if not, outputting said increment signal; and (iv) adder means, coupled to said wrap prevention means, for receiving said increment signal and said second part and incrementing said second part in accordance with said increment signal.

5. The computer graphics system recited in claim 4, wherein said read/write means comprises means for adjusting said window-relative values in accordance with said transformation values to produce screen-relative values.

6. The computer graphics system recited in claim 5, wherein said read/write means further comprises means for receiving said screen-relative values and computing row and column indices (i,j) in accordance with the relation: i=X modulo-N and J=Y modulo-N, where N represents the number of rows and columns in said dither value storage means and X and Y represent said screen-relative values.

7. A method for dithering a pixel value corresponding to first and second window-relative coordinates ($X_W$, $Y_W$), said window-relative coordinates defining a location relative to a predefined point in a window of a display, comprising the steps:

(a) determining first and second transformation values;

(b) programmatically reading a dither value from a row-column address of a dither value storage cell, said row-column address determined as a function of at least said window-relative coordinates ($X_W$, $Y_W$) and said first and second transformation values;

(c) comparing said dither value read from said dither cell with a first part of said pixel value and generating a dither signal in accordance with said comparison;

(d) determining whether said second part would wrap if dithered and, if so, overriding or inhibiting said dither signal, thereby preventing the dithering of said second part; and (e) dithering a second part of said pixel value in accordance with said dither signal.

8. The method recited in claim 7, wherein step (b) comprises adjusting said window-relative values in accordance with said transformation values to produce screen-relative values.

9. The method recited in claim 8, wherein step (b) further comprises determining row and column indices (i,j) in accordance with the relation: i=X modulo-N and j=Y modulo-N, where N represents the number of rows and columns in said dither value storage cell.

10. In a computer graphics system, a method for rendering a pixel corresponding to first and second window-relative coordinates ($X_W$, $Y_W$), said window-relative coordinates defining a location relative to a predefined point in a window of a display, comprising the steps:

(a) generating a pixel value represented as a digital word comprising a first part and a second part;

(b) determining first and second transformation values;

(c) programmatically reading a dither value from a row-column address of a dither value storage cell, said row-column address determined as a function of at least said window-relative coordinates ($X_W$, $Y_W$) and said first and second transformation values;

d) comparing said dither value read from said dither cell with said first part of said pixel value and generating a dither signal in accordance with said comparison;

(e) determining whether said second part would wrap if dithered and, if so, overriding or inhibiting said dither signal, and dithering said second part of said pixel value in accordance with said dither signal; and (f) storing said pixel value in a frame buffer.

11. The method recited in claim 10, wherein step (c) comprises adjusting said window-relative coordinates in accordance with said transformation values to produce screen-relative coordinates.

12. The method recited in claim 11, wherein step (c) further comprises determining row and column indices (i,j) in accordance with the relation: i=X modulo-N and j=Y modulo-N, where N represents the number of rows and columns in said dither value storage cell.

* * * * *